(12) United States Patent
Yoshizawa et al.

(10) Patent No.: US 12,078,139 B2
(45) Date of Patent: Sep. 3, 2024

(54) VEHICLE WITH ELECTRIC POWER SUPPLY CONTROL

(71) Applicant: SUBARU CORPORATION, Tokyo (JP)

(72) Inventors: Akashi Yoshizawa, Tokyo (JP); Takashi Inoue, Tokyo (JP); Tetsuo Kobayashi, Tokyo (JP); Shinya Kurasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 52 days.

(21) Appl. No.: 17/981,797

(22) Filed: Nov. 7, 2022

(65) Prior Publication Data

US 2023/0151787 A1    May 18, 2023

(30) Foreign Application Priority Data

Nov. 16, 2021    (JP) .................. 2021-186543

(51) Int. Cl.
| | |
|---|---|
| *F02N 11/00* | (2006.01) |
| *B60R 16/033* | (2006.01) |
| *F02N 11/08* | (2006.01) |
| *H02J 7/00* | (2006.01) |
| *H02J 7/34* | (2006.01) |

(52) U.S. Cl.
CPC ........ *F02N 11/0866* (2013.01); *B60R 16/033* (2013.01); *F02N 11/087* (2013.01); *H02J 7/0013* (2013.01); *H02J 7/342* (2020.01); *F02N 2011/0874* (2013.01); *H02J 2207/20* (2020.01)

(58) Field of Classification Search
CPC .................. F02N 11/0866; H01M 10/44
See application file for complete search history.

(56) References Cited

U.S. PATENT DOCUMENTS

| | | | | |
|---|---|---|---|---|
| 2006/0097577 A1* | 5/2006 | Kato | ............... | H02J 7/1423 307/10.1 |
| 2010/0133900 A1* | 6/2010 | King | ............... | B60L 58/40 180/65.21 |
| 2015/0300308 A1* | 10/2015 | Mori | ............... | F02N 11/108 903/907 |
| 2016/0036371 A1* | 2/2016 | Yamasaki | ............... | B62D 5/046 318/400.22 |
| 2016/0040642 A1* | 2/2016 | Miyake | ............... | F02N 11/0866 290/31 |

(Continued)

FOREIGN PATENT DOCUMENTS

JP    2016-68740 A    5/2016

*Primary Examiner* — Adi Amrany
(74) *Attorney, Agent, or Firm* — TROUTMAN PEPPER HAMILTON SANDERS LLP

(57) ABSTRACT

A vehicle includes a first power system, a second power system, a switching relay, and a relay controller. The first power system is coupled to an engine restart motor. The second power system is provided independently of the first power system and is coupled to a starter and an accessory. The coupling state of the switching relay is switchable to an on state in which the first power system and the second power system are coupled, and to an off state in which the first power system and the second power system are not coupled. The relay controller is configured to receive a supply of electric power from both the first power system and the second power system and to control the coupling state of the switching relay.

2 Claims, 2 Drawing Sheets

(56) References Cited

U.S. PATENT DOCUMENTS

| | | | |
|---|---|---|---|
| 2016/0090078 A1 | 3/2016 | Satomura | |
| 2016/0288651 A1* | 10/2016 | Kinoshita | B60L 7/10 |
| 2017/0158082 A1* | 6/2017 | Tahara | B60L 3/04 |
| 2017/0259803 A1* | 9/2017 | Khafagy | B60W 10/08 |
| 2018/0154786 A1* | 6/2018 | Wang | B60L 53/24 |
| 2018/0202408 A1* | 7/2018 | Majima | F02N 11/0837 |
| 2018/0233943 A1* | 8/2018 | Koizumi | B60L 7/18 |
| 2018/0261890 A1* | 9/2018 | Yan | B60R 16/04 |
| 2018/0304763 A1* | 10/2018 | Moriya | B60W 10/26 |
| 2019/0184964 A1* | 6/2019 | Murakami | B60K 6/28 |
| 2020/0036203 A1* | 1/2020 | Ruiz-Garcia | H02J 9/005 |
| 2020/0122580 A1* | 4/2020 | Zou | B60L 53/30 |
| 2020/0130695 A1* | 4/2020 | Ando | F02N 11/0862 |
| 2020/0216003 A1* | 7/2020 | Morita | B60R 16/03 |
| 2021/0094441 A1* | 4/2021 | Sampson | B60K 1/02 |
| 2022/0227257 A1* | 7/2022 | Wand | H02J 1/10 |

* cited by examiner

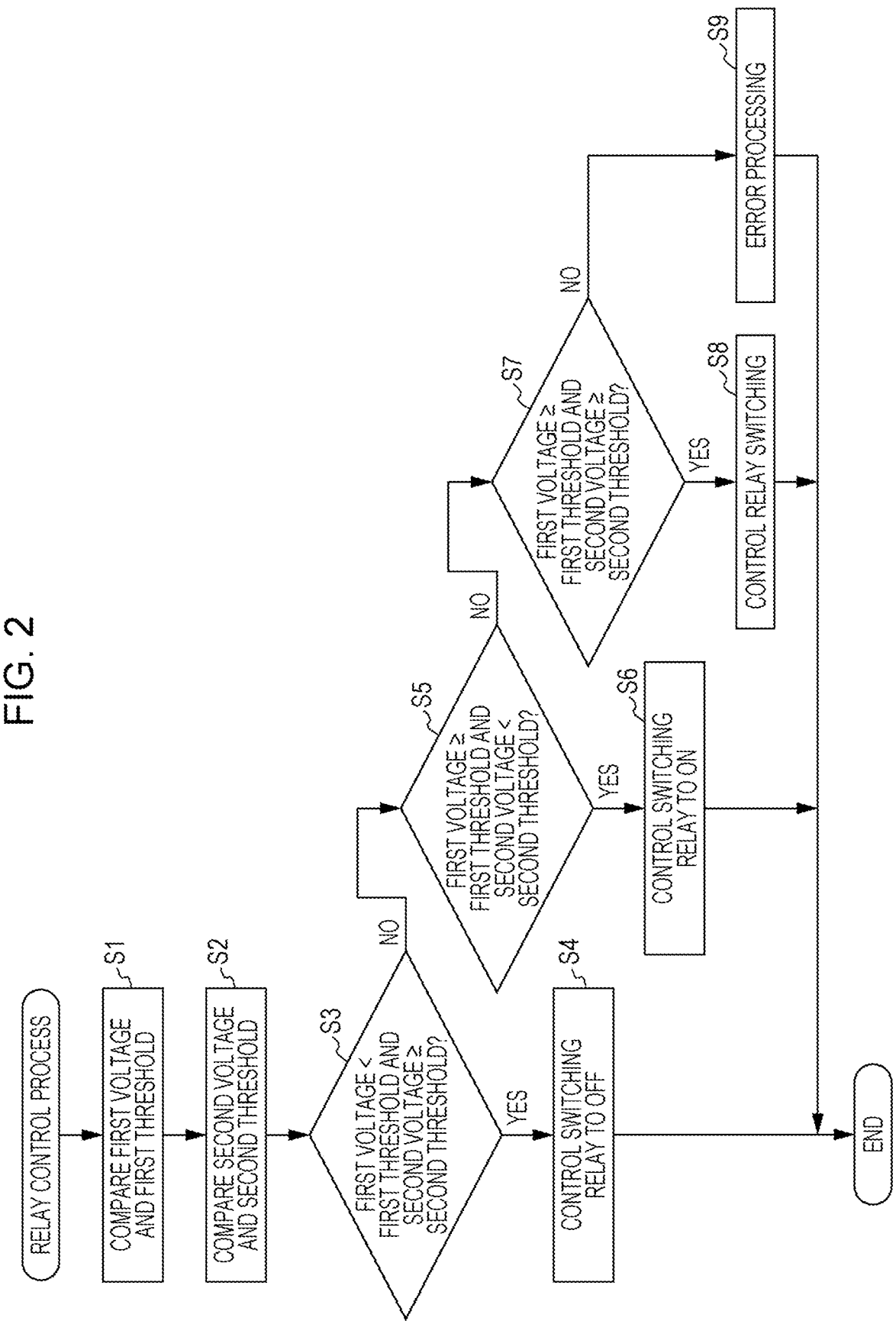

VEHICLE WITH ELECTRIC POWER SUPPLY CONTROL

CROSS-REFERENCE TO RELATED APPLICATION

The present application claims priority from Japanese Patent Application No. 2021-186543 filed on Nov. 16, 2021, the entire contents of which are hereby incorporated by reference.

BACKGROUND

The disclosure relates to a vehicle.

For a hybrid vehicle equipped with a traveling motor and an engine, there has been available a technique for driving the traveling motor with the power of a main battery and starting the engine with the power of a sub battery (see, for example, Japanese Unexamined Patent Application Publication No. 2016-068740).

SUMMARY

An aspect of the disclosure provides a vehicle. The vehicle includes a first power system, a second power system, a switching relay, and a relay controller. The first power system is coupled to an engine restart motor. The second power system is provided independently of the first power system and coupled to a starter and an accessory. A coupling state of the switching relay is switchable to an on state in which the first power system and the second power system are coupled, and to an off state in which the first power system and the second power system are not coupled. The relay controller is configured to receive a supply of electric power from both the first power system and the second power system and to control the coupling state of the switching relay.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 2 is a flowchart of a relay control process.

DETAILED DESCRIPTION

Figure 1:
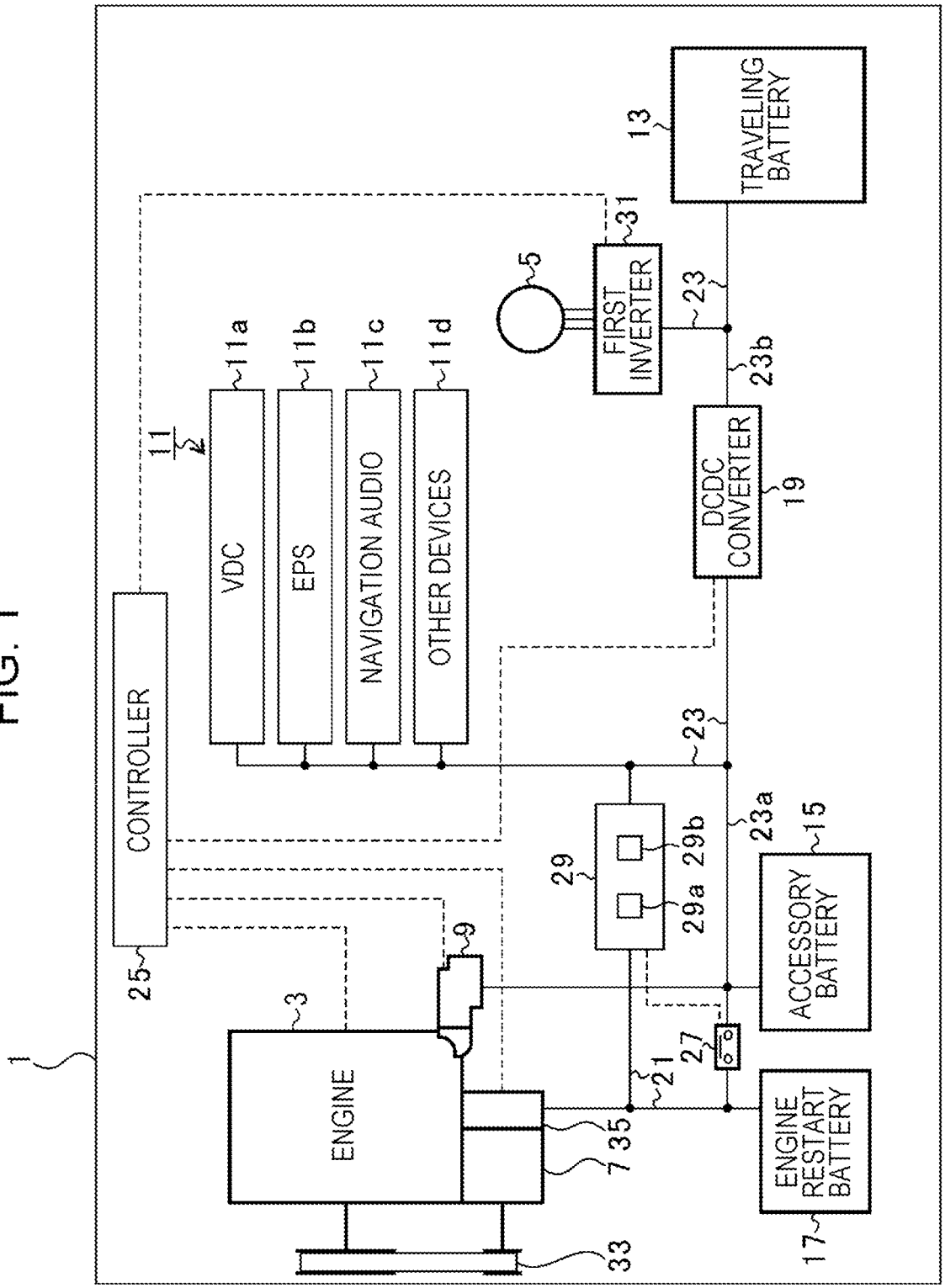
FIG. 1 is a diagram illustrating the configuration of a vehicle.

In the case where a hybrid vehicle is stored without being driven for a long period of time, a battery coupled to a starter may be depleted due to dark current, which may cause engine starting malfunction.

It is desirable to provide a vehicle capable of reducing engine starting malfunction.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a diagram illustrating the configuration of a vehicle 1. As illustrated in FIG. 1, the vehicle 1 is a hybrid vehicle equipped with an engine 3 and a traveling motor 5. The vehicle 1 includes an integrated starter generator (ISG) 7, a starter 9, accessories 11, a traveling battery 13, an accessory battery 15, an engine restart battery 17, a direct-current-to-direct-current (DCDC) converter 19, a first power system 21, a second power system 23, a controller 25, a switching relay 27, and a relay controller 29.

The engine 3 is, for example, a gasoline engine or a diesel engine. The engine 3 rotates a crankshaft by moving a piston back and forth with a combustion pressure in a combustion chamber. The crankshaft is coupled to a power transmission device (not illustrated), and the power transmission device transmits the power of the engine 3 to drive wheels (not illustrated).

The traveling motor 5 is, for example, a synchronous rotary electric device. The traveling motor 5 is controlled by application of a three-phase alternating current (AC) generated by a first inverter 31 based on a command from the controller 25.

The traveling motor 5 operates as an electric motor that rotates and drives by receiving a supply of electric energy from the traveling battery 13. In the case where the traveling motor 5 operates as an electric motor, the rotational driving force generated by the traveling motor 5 is transmitted to the drive wheels (not illustrated) via the power transmission device (not illustrated). In addition, the traveling motor 5 serves as a power generator when it receives rotational energy from the engine 3 or the drive wheels. The traveling battery 13 is charged with the electric energy generated by the traveling motor 5 through the first inverter 31.

The ISG 7 is coupled to the crankshaft of the engine 3 via a pulley belt 33. The ISG 7 serves as a power generator when it receives rotational energy from the engine 3. The engine restart battery 17 is charged with the electric energy generated by the ISG 7 through a second inverter 35.

Moreover, the ISG 7 operates as an electric motor that rotates and drives by receiving a supply of electric energy from the engine restart battery 17. The ISG 7 is controlled by application of a three-phase AC generated by the second inverter 35 based on a command from the controller 25.

In the case where the ISG 7 operates as an electric motor, the ISG 7 assists the driving force of the engine 3 or restarts the engine 3 in the event of an idling stop. As mentioned above, the ISG 7 serves as an engine restart motor in the event of an idling stop.

The starter 9 is, for example, a DC motor. The starter 9 operates as an electric motor that rotates and drives by receiving a supply of electric energy from the accessory battery 15. The starter 9 is rotated and controlled based on a command from the controller 25. The starter 9 is, for example, engaged via a pinion with an outer peripheral gear of a flywheel (not illustrated) of the engine 3 and is used to start the engine 3.

The accessories 11 are devices that operate by receiving a supply of electric energy from the accessory battery 15 and the traveling battery 13. The accessories 11 include, for example, a vehicle dynamics control (VDC) 11a, an electric power steering (EPS) 11b, a navigation audio 11c, and other devices 11d.

The VDC 11a is a device that monitors the driver's vehicle operation and the vehicle movement using various sensors and controls the brake pressure, engine output, and the like according to the driving state. The EPS 11b is a device that electrically assists the force necessary for steering operation. The navigation audio 11c is an automotive navigation system in which audio and visual functions are added to a navigation function. The other devices 11d include, for example, an automatic driving camera, various sensors, a cooling fan, an air conditioner compressor, and the like.

The first power system 21 includes the engine restart battery 17. The first power system 21 is electrically coupled to the ISG 7, the second inverter 35, the switching relay 27, the relay controller 29, and the engine restart battery 17. The second power system 23 is provided independently of the first power system 21. The second power system 23 includes the accessory battery 15 and the traveling battery 13. The second power system 23 is electrically coupled to the starter 9, the accessories 11, the DCDC converter 19, the traveling motor 5, the first inverter 31, the switching relay 27, the relay controller 29, the accessory battery 15, and the traveling battery 13. Note that the DCDC converter 19 for converting voltage is provided between the traveling battery 13 and the accessory battery 15.

The second power system 23 is divided, with the DCDC converter 19 interposed therebetween, into an accessories-side power system 23a and a traveling-motor-side power system 23b. The accessories-side power system 23a is electrically coupled to the starter 9, the accessories 11, the switching relay 27, the relay controller 29, the DCDC converter 19, and the accessory battery 15. The traveling-motor-side power system 23b is electrically coupled to the traveling motor 5, the first inverter 31, the DCDC converter 19, and the traveling battery 13.

The engine restart battery 17 is, for example, a lead-acid battery with an output voltage of DC 12 V. The engine restart battery 17 is electrically coupled by the first power system 21 to the second inverter 35 and the ISG 7. The engine restart battery 17 supplies electric energy to the ISG 7 via the second inverter 35. The engine restart battery 17 is charged with electric energy generated by the ISG 7 from the second inverter 35.

The accessory battery 15 is, for example, a lead-acid battery with an output voltage of DC 12 V. The accessory battery 15 is electrically coupled by the second power system 23 to the starter 9 and the accessories 11. The accessory battery 15 supplies electric energy to the starter 9 and the accessories 11. Moreover, the accessory battery 15 is charged with electric energy from the traveling battery 13 via the DCDC converter 19.

The traveling battery 13 is, for example, a lithium ion battery with an output voltage of DC 48 V. The traveling battery 13 has a higher output voltage than the engine restart battery 17 and the accessory battery 15. Note that the output voltage of the traveling battery 13 is not limited to 48 V, and may be higher than 48 V, such as 200 V, or may be lower than 48 V.

The traveling battery 13 is electrically coupled to the first inverter 31 and the traveling motor 5. The traveling battery 13 supplies electric energy to the traveling motor 5 via the first inverter 31. Moreover, the traveling battery 13 is charged with electric energy generated by the traveling motor 5 from the first inverter 31.

Note that each battery is provided with a battery sensor (not illustrated), and the remaining battery capacity (state of charge (SOC)) and voltage of each battery are measured. The battery sensor is coupled to the relay controller 29, and information on the SOC and voltage of each battery is sent to the relay controller 29. Note that the voltage of each battery is accurately measured by the battery sensor, regardless of where each battery is coupled.

The DCDC converter 19 has a step-down function of stepping down 48 V of the traveling-motor-side power system 23b to 14.6 V and outputting 14.6 V to the accessories-side power system 23a. In doing so, the DCDC converter 19 is able to output a voltage of 14.6 V to the accessories-side power system 23a, regardless of the operating state of the engine 3.

The controller 25 is electrically coupled to the engine 3, the starter 9, the first inverter 31, the second inverter 35, and the DCDC converter 19 to control these devices. The controller 25 performs control to switch the driving mode of the vehicle 1, for example.

In one example, the driving mode of the vehicle 1 includes an electric vehicle (EV) driving mode, an engine driving mode, a parallel hybrid electric vehicle (HEV) driving mode, and a series HEV driving mode. The EV driving mode is a mode in which the vehicle 1 drives with the driving force of the traveling motor 5 alone, and the engine traveling mode is a mode in which the vehicle 1 drives with the driving force of the engine 3 alone.

The parallel HEV driving mode is a mode in which the vehicle 1 drives with the driving force of the engine 3 and the driving force of the traveling motor 5. The series HEV driving mode is a mode in which the traveling motor 5 is driven by electric energy generated by a motor generator (not illustrated) using the engine 3, and the vehicle 1 drives with the driving force of the traveling motor 5 alone.

The switching relay 27 is disposed between the first power system 21 and the second power system 23 and is coupled to both the first power system 21 and the second power system 23. The switching relay 27 is configured to be switchable to an on state in which the first power system 21 and the second power system 23 are electrically coupled, and to an off state in which the coupling is released.

The relay controller 29 includes one or more processors 29a and one or more memories 29b coupled to the processor(s) 29a. The processor(s) 29a includes, for example, a central processing unit (CPU).

The memory(ies) 29b includes, for example, read only memory (ROM) and random access memory (RAM). The ROM is a storage element that stores programs, calculation parameters, and the like used by the CPU. The RAM is a storage element that temporarily stores data such as variables and parameters used for processing executed by the CPU.

Various processes performed by the relay controller 29 may be executed by the processor(s) 29a. In detail, various processes are executed by the processor(s) 29a executing programs stored in the memory(ies) 29b.

Note that the functions of the relay controller 29 according to the present embodiment may be divided into control devices, or functions may be realized by one control device. In the case where the functions of the relay controller 29 are divided into control devices, the control devices may be coupled to each other via a communication bus such as a Controller Area Network (CAN) bus.

The relay controller 29 is coupled to the first power system 21 and the second power system 23 respectively via backflow prevention diodes (not illustrated). With the above backflow prevention diodes, no current flows from the first power system 21 to the second power system 23, and no current flows from the second power system 23 to the first power system 21. The relay controller 29 receives a supply of electric power from both the first power system 21 and the second power system 23 and controls the coupling state of the switching relay 27. In detail, the relay controller 29 receives a supply of electric power from whichever of the first power system 21 and the second power system 23 having a higher electric potential.

The relay controller 29 compares the voltage (first voltage) of the engine restart battery (first power supply) 17 included in the first power system 21 and a first threshold. The relay controller 29 also compares the stepped-down voltage (second voltage), stepped down by the DCDC converter 19, of the traveling battery (second power supply) 13 included in the second power system 23 and a second threshold. Alternatively, the relay controller 29 compares the voltage (second voltage) of the accessory battery (second power supply) 15 included in the second power system 23 and the second threshold. Note that the relay controller 29 may compare the voltage (second voltage) of the traveling battery (second power supply) 13 included in the second power system 23 and the second threshold.

Here, data of the first threshold and the second threshold is stored in the memory(ies) 29b. The first threshold is the value of a voltage smaller than a voltage in the voltage normal range of the engine restart battery 17. The first threshold is the value of a voltage necessary to start the engine 3.

The second threshold is the value of a voltage smaller than a voltage in the voltage normal range of the accessory battery 15. Alternatively, the second threshold is the value of a voltage smaller than the stepped-down voltage of the traveling battery 13, stepped down by the DCDC converter 19. The second threshold is the value of a voltage necessary to start the engine 3. Although the first threshold and the second threshold are the same value in the present embodiment, they may be different values.

Then, the relay controller 29 controls the coupling state of the switching relay 27 based on the result of comparing the first voltage and the first threshold and the result of comparing the second voltage and the second threshold. In one example, when the first voltage is less than the first threshold and the second voltage is greater than or equal to the second threshold, the relay controller 29 controls the switching relay 27 to the off state. In doing so, the first power system 21 is not coupled to the starter 9, and the second power system 23 is coupled to the starter 9. Therefore, electric power can be supplied to the starter 9 from a battery with the second voltage, which is greater than or equal to the second threshold, included in the second power system 23.

In contrast, when the first voltage is greater than or equal to the first threshold and the second voltage is less than the second threshold, the relay controller 29 controls the switching relay 27 to the on state. In doing so, the first power system 21 is coupled to the starter 9. Therefore, electric power can be supplied to the starter 9 from a battery with the first voltage, which is greater than or equal to the first threshold, included in the first power system 21.

When the first voltage is greater than or equal to the first threshold and the second voltage is greater than or equal to the second threshold, the relay controller 29 controls the coupling state of the switching relay 27 so that the power system having a higher voltage out of the first voltage and the second voltage will be coupled to the starter 9.

In the present embodiment, the stepped-down voltage stepped down by the DCDC converter 19 in the second power system 23 is higher than the output voltage output from the engine restart battery 17 in the first power system 21.

When the relay controller 29 determines that the first voltage is greater than or equal to the first threshold and the second voltage is greater than or equal to the second threshold, and the second voltage is higher out of the first voltage and the second voltage, the relay controller 29 controls the switching relay 27 to the off state. That is, the relay controller 29 performs control so that the first power system 21 will not be coupled to the starter 9 and the second power system 23 will be coupled to the starter 9. In doing so, electric power can be supplied to the starter 9 from a battery included in whichever of the first power system 21 and the second power system 23 having a higher voltage.

In contrast, when the relay controller 29 determines that the first voltage is greater than or equal to the first threshold and the second voltage is greater than or equal to the second threshold, and that the first voltage is higher out of the first voltage and the second voltage, the relay controller 29 controls the switching relay 27 to the on state. That is, the relay controller 29 performs control so that the first power system 21 will be coupled to the starter 9. In doing so, electric power can be supplied to the starter 9 from a battery included in whichever of the first power system 21 and the second power system 23 having a higher voltage. However, this is not the only possible operation, and, in this case, the relay controller 29 may prioritize the SOC maintenance of the engine restart battery 17 and control the switching relay 27 to the off state. That is, even when the relay controller 29 determines that the first voltage is higher than the second voltage, the relay controller 29 may prioritize the SOC maintenance of the engine restart battery 17, and may perform control so that the first power system 21 will not be coupled to the starter 9 and the second power system 23 will be coupled to the starter 9. In doing so, when the first voltage is greater than or equal to the first threshold and the second voltage is greater than or equal to the second threshold, while the SOC of the engine restart battery 17 is being maintained, the starter 9 can be supplied with electric power from the second power system 23.

Here, suppose that the relay controller 29 determines that the SOC of the engine restart battery 17 is greater than or equal to a certain value and that the SOC of the traveling battery 13 is less than the certain value. In that case, for example, even if the second voltage is higher out of the first voltage and the second voltage, the relay controller 29 may control the switching relay 27 to the on state so that the starter 9 will be coupled to the engine restart battery 17.

FIG. 2 is a flowchart of a relay control process. As illustrated in FIG. 2, the relay controller 29 firstly compares the first voltage and the first threshold (S1). Next, the relay controller 29 compares the second voltage and the second threshold (S2).

Then, the relay controller 29 determines whether the first voltage is less than the first threshold and whether the second voltage is greater than or equal to the second threshold (S3). In the case where it is determined YES in S3, the relay controller 29 controls the switching relay 27 to the off state (S4).

In the case where it is determined NO in S3, the relay controller 29 determines whether the first voltage is greater than or equal to the first threshold and whether the second voltage is less than the second threshold (S5). In the case where it is determined YES in S5, the relay controller 29 controls the switching relay 27 to the on state (S6).

In the case where it is determined NO in S5, the relay controller 29 determines whether the first voltage is greater than or equal to the first threshold and whether the second voltage is greater than or equal to the second threshold (S7). In the case where it is determined YES in S7, the relay controller 29 controls the coupling state of the switching relay 27 so that the power system having a higher voltage out of the first voltage and the second voltage will be coupled to the starter 9 (S8), and ends the relay control process.

In S8, however, the relay controller 29 may control the coupling state of the switching relay 27 based on the SOC of batteries included in the first power system 21 and the second power system 23, regardless of which voltage is higher or lower. That is, the relay controller 29 may control the coupling state of the switching relay 27 so that, out of batteries included in the first power system 21 and the second power system 23, a battery whose SOC is greater than or equal to a certain value will be preferentially coupled to the starter 9. In one example, suppose that the relay controller 29 determines that the SOC of the engine restart battery 17 included in the first power system 21 is greater than or equal to the certain value, and that the SOC of the traveling battery 13 included in the second power system 23 is less than the certain value. In that case, for example, even if the second voltage is higher out of the first voltage and the second voltage, the relay controller 29 may control the switching relay 27 to the on state so that the starter 9 will be coupled to the engine restart battery 17.

In the case where it is determined NO in S7, the relay controller 29 determines that the first voltage is less than the first threshold and the second voltage is less than the second threshold, and that the starter 9 cannot be driven, executes error processing to report that the starter 9 cannot be driven (S9), and ends the relay control process.

As described above, the relay controller 29 of the present embodiment is configured to be able to receive a supply of electric power from both the first power system 21 and the second power system 23. In doing so, even if the traveling battery 13 and the accessory battery 15 are depleted or the engine restart battery 17 is depleted, the relay controller 29 can be supplied with electric power.

Therefore, the relay controller 29 can receive a supply of electric power from a battery that has not been depleted, control the switching relay 27, and supply the power from the non-depleted battery to the starter 9. As a result, engine start malfunction may be reduced.

Moreover, the relay controller 29 couples the power system having a higher voltage out of the first voltage and the second voltage to the starter 9. The higher the voltage, the less sound and vibration given to the occupant(s) when the engine 3 is started. In addition, since the traveling battery 13 is charged using excess regenerative energy during driving and does not demand new energy for charging, it is more efficient to use the electric energy of the traveling battery (high voltage battery) 13 for driving the starter 9. Therefore, as the power system coupled to the starter 9, priority is given to the power system having a higher voltage out of the first voltage and the second voltage.

Although the preferred embodiment of the disclosure has been described above with reference to the accompanying drawings, it goes without saying that the disclosure is not limited to the above embodiment. It is obvious for those skilled in the art to conceive of various changes or modifications within the scope of the claims, which are naturally understood to be within the technical scope of the disclosure.

In the above embodiment, an example in which the relay controller 29 compares the first voltage and the first threshold and compares the second voltage and the second threshold has been described. However, this is not the only possible case, and the relay controller 29 may control the coupling state of the switching relay 27 so that the power system having a higher voltage will be coupled to the starter 9, without comparing the voltage and the threshold.

In the above embodiment, an example in which the second power system 23 includes the traveling battery 13 and the accessory battery 15 has been described. However, this is not the only possible case, and the second power system 23 may be provided with the accessory battery 15 alone, without the traveling battery 13. Alternatively, the second power system 23 may be provided with the traveling battery 13 alone, without the accessory battery 15.

The relay controller 29 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the relay controller 29. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
    an engine;
    a starter motor configured to start the engine;
    an integrated starter generator (ISG) provided independently of the starter motor and configured to restart the engine during an idling stop of the vehicle;
    a first battery;
    a second battery provided independently of the first battery;
    a first power system coupled to the ISG and the first battery;
    a second power system provided independently of the first power system and coupled to the starter motor, the second battery and an accessory;
    a switching relay configured to be switchable to an on state in which the first power system is coupled to the second power system via the switching relay, and to an off state in which the first power system is not coupled to the second power system; and
    a relay controller configured to:
        receive a supply of electric power from both the first and second battery via the first power system and the second power system; and
        control a switching of the coupling state of the switching relay between the on state and the off state,
    wherein the relay controller is further configured to:
        determine whether a first voltage of the first battery is equal to or greater than a predetermined first threshold, the first voltage being detected by a first battery sensor provided with the first battery;

determine whether a second voltage of the second battery is equal to or greater than a predetermined second threshold, the second voltage being detected by a second battery sensor provided with the second battery;

in response to determining that i) the first voltage is not equal to or greater than the predetermined first threshold and ii) the second voltage is equal to or greater than the predetermined second threshold, control the switching of the coupling state of the switching relay to the off state;

in response to determining that i) the first voltage is equal to or greater than the predetermined first threshold and ii) the second voltage is not equal to or greater than the predetermined second threshold, control the switching of the coupling state of the switching relay to the on state;

in response to determining that i) the first voltage is equal to or greater than the predetermined first threshold and ii) the second voltage is equal to or greater than the predetermined second threshold, determine whether the second voltage is greater than the first voltage;

in response to determining that the second voltage is greater than the first voltage, control the switching of the coupling state of the switching relay to the off state; and in response to determining that the second voltage is not greater than the first voltage, control the switching of the coupling state of the switching relay to the on state, wherein the ISG is further configured to restart the engine by using an electric power supplied from the first battery via the first power system.

2. The vehicle according to claim 1, wherein the relay controller is further configured to, in response to determining that i) the first voltage is not equal to or greater than the predetermined first threshold and ii) the second voltage is not equal to or greater than the predetermined second threshold, execute an error processing to report that the starter motor cannot be driven.

* * * * *